Feb. 28, 1933.                S. SCHIFF                1,899,246
                          DOUGH PROOFING DEVICE
                           Filed Jan. 24, 1931         3 Sheets-Sheet 2

Inventor
Sigmund Schiff

By Murray & Bugelten
                                              Attorneys

Feb. 28, 1933.   S. SCHIFF   1,899,246
DOUGH PROOFING DEVICE
Filed Jan. 24, 1931   3 Sheets-Sheet 3

Inventor
Sigmund Schiff
By Murray end Bugelton
Attorneys

Patented Feb. 28, 1933

1,899,246

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

DOUGH PROOFING DEVICE

Application filed January 24, 1931. Serial No. 511,003.

The present invention relates to improvements in dough proofing devices and has for an object the provision of an automatic proofer that carries lumps of dough from an intake through a proofing travel and discharges them with uniformity and without disturbing the texture of the skin formed on the lumps.

Another object is to provide a continuously moving series of flexible carrier loops and means whereby said loops are definitely controlled just prior to loading and during discharge of the dough lumps.

Another object is to provide a flexible loop type of proofer with means to effect a perfectly timed and uniform discharge.

These and other objects are attained by the means described herein and disclosed in the accompanying drawings, in which.

Figure 1:
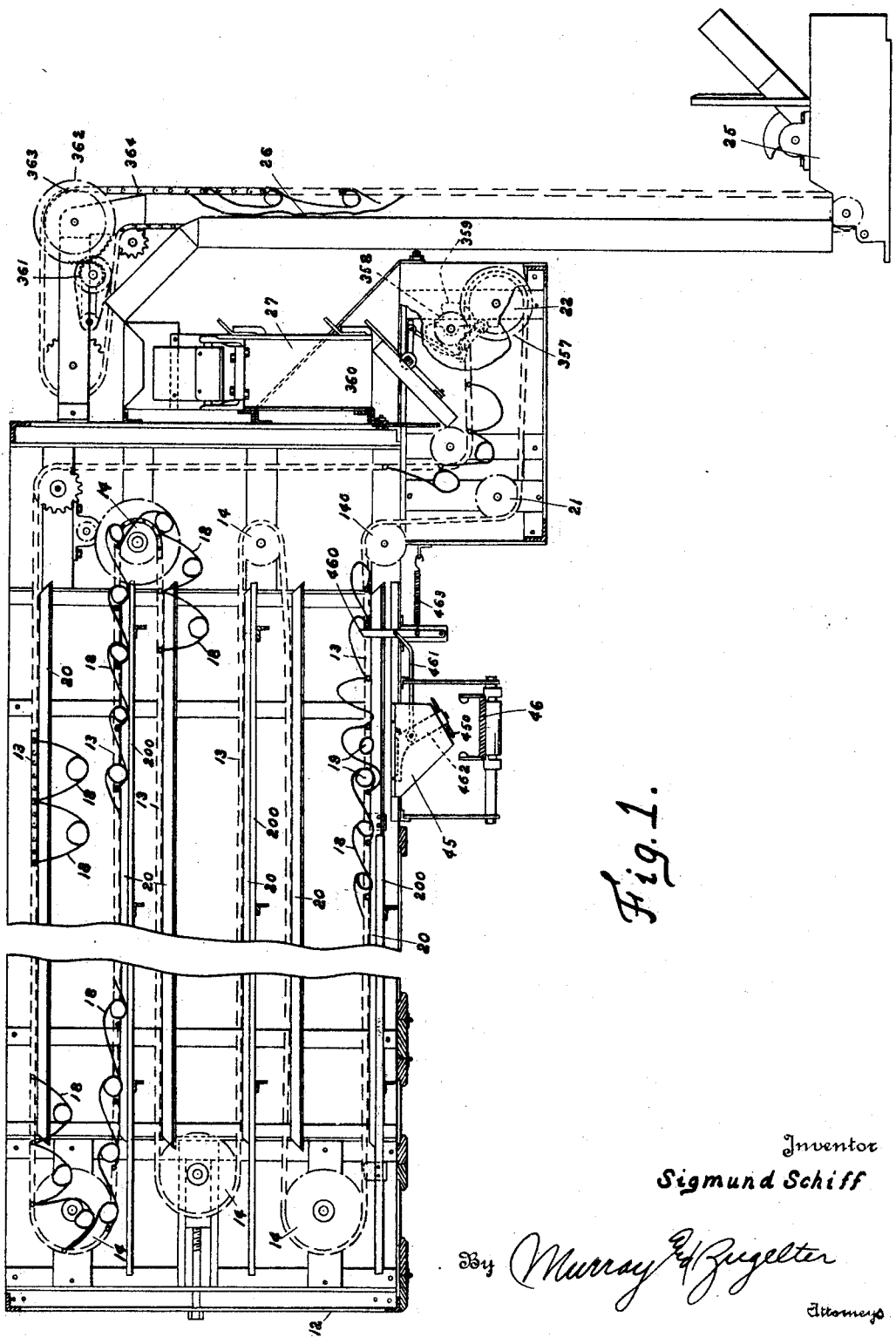
Fig. 1 is a side sectional, elevational view of a loop proofer embodying the present invention.

The proofer of the present invention is preferably elevated above the shop floor at a sufficient height to permit other cooperating machines of a chain of automatic dough working machinery, to be installed beneath it. A proofer casing 12 of the general construction shown in my Patent No. 1,656,890 is employed to suitably enclose a flexible pocket type or loop conveyor, which consists of parallel spaced endless chains 13 extending about sprockets 14 at opposite longitudinal ends of the casing in substantially the same manner as shown in my Patents Nos. 1,575,282 and 1,656,890. In the present construction, however, the endless sheet of fairly heavy and stiff flexible material 15, such as two-ply canvas, is positively secured by rivets or screws 16 to the pipes or rods 17 which space the chains 13. The pipes loosely receive extended chain pins 130, provided at intervals along the chains 13. The length of canvas between adjacent rods 17 is sufficient to provide loops or pockets 18 which are flexible and to a large degree subject to the influence of gravity, especially when carrying a plurality of lumps of dough 19.

Figure 2:
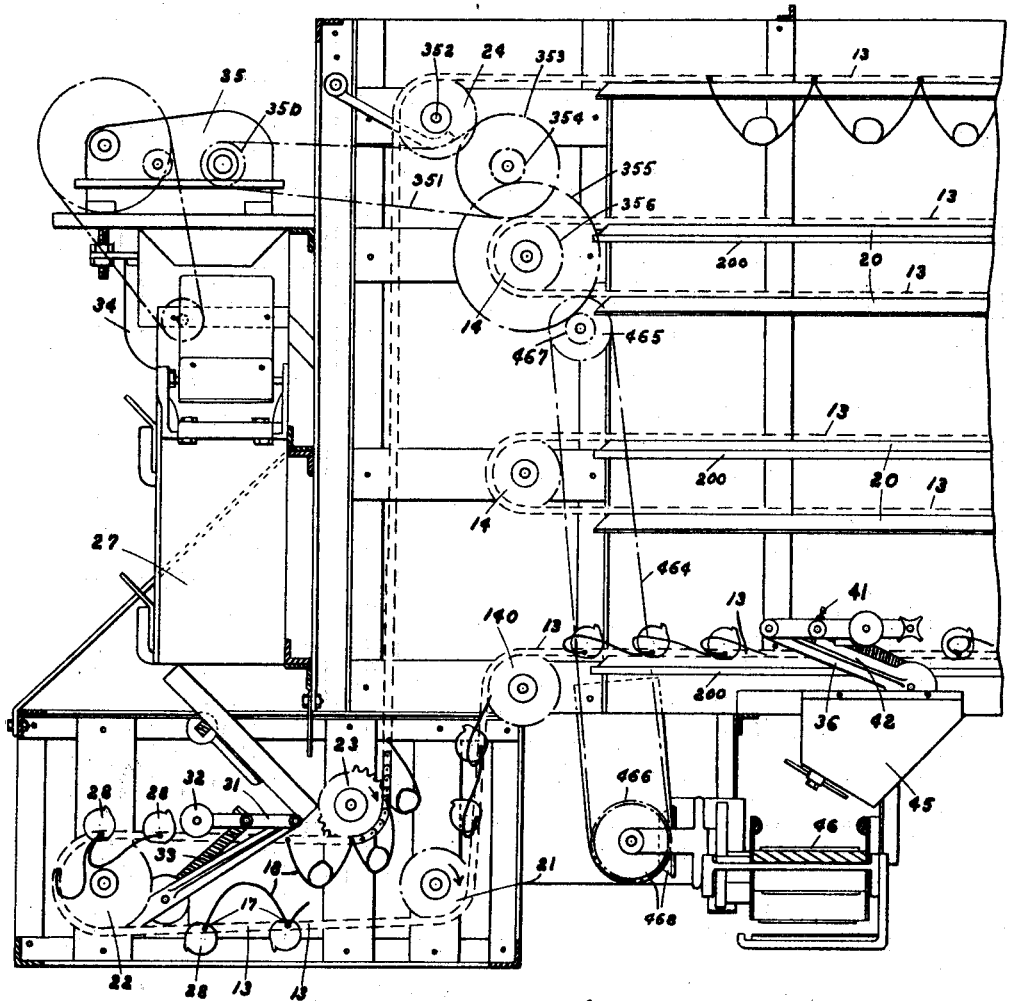
Fig. 2 is an enlarged elevational cross sectional view looking from the opposite side from Fig. 1.

As explained in my prior Patent No. 1,656,890, and as will be clearly understood from an inspection of Fig. 1 of the drawings herein, the chains 13 carrying the rods 17 from which the flexible material is suspended, pass alternately in opposite directions over the sprockets to successively lower reaches within the casing, during which interval of travel the lumps of dough in the pockets or loop 18 are proved. The chains ride upon supports 20 intermediate sprockets 14 to preclude sagging thereof under the weight of the dough. As best illustrated in Fig. 2, the lowermost reach of the conveyor, after passing the discharge position is directed downwardly by passing the chains 13 over sprockets 140, thence around sprockets 21 and 22. The chains then carry the conveyor through a short horizontal loading reach to sprockets 23 from which the conveyor moves through a vertical reach to the sprockets 24 which establish the level of the uppermost horizontal reach within the proofing chamber. A suitable intake 25 receives lumps of dough and directs them into a suitable elevating mechanism 26 from which the lumps pass through a suitable loading mechanism 27 into the pockets 18 as they move through the loading reach between sprockets 22 and 23. The action of the flexible pockets 18 effects a gentle, intermittent rolling of the lumps in opposite directions as fully explained in my Patent No. 1,658,890. The present invention is directed especially to improvements in the means for positively controlling and positioning the pockets at the loading and discharge points while retaining the advantages of my said prior patents.

To this end the flexible material is positively secured to rods 17 by the means 16 as previously mentioned and the ends of rods 17 are suitably journalled in the chains. Each rod 17 has secured thereto at one side of the pocket an eccentric tilting ring 28 (see Figs. 3, 4 and 5). The shape of the tilting ring is generally circular with a flat straight face portion 29 at one side and an abrupt nose or lug 30 substantially opposite the said flat face 29. It will be seen that means acting on the tilting rings will turn rods 17 in their bearings and definitely control and position the connected ends of adjacent pockets so that such pockets are definitely righted for loading and inverted for discharging.

Figure 7:
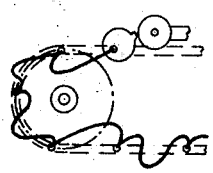
Fig. 7 illustrates an occasional abnormal positioning of loops or pockets forming details of the invention.
Figure 3:
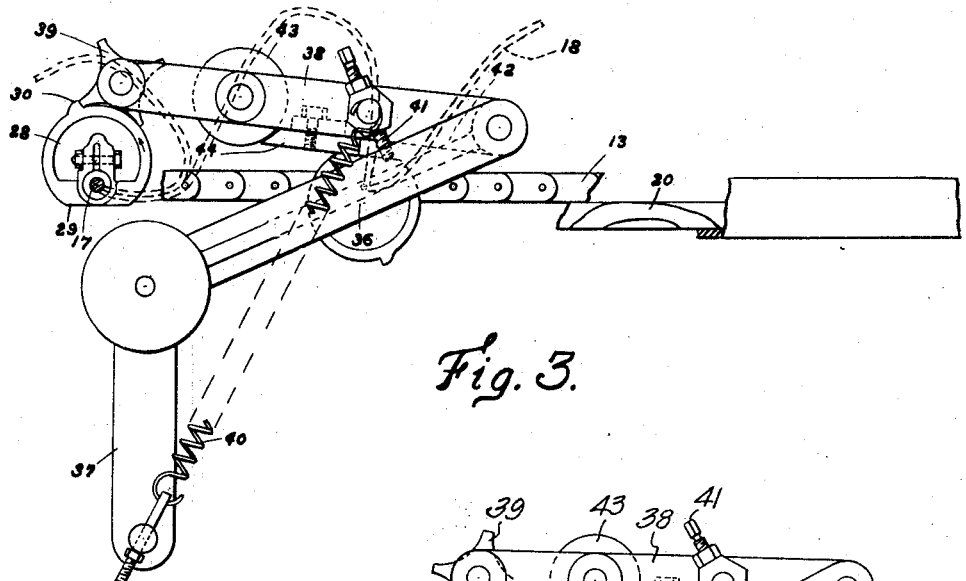
Figs. 3, 4 and 5 are side elevational views showing a loop tilting mechanism in various positions during the discharge operation.
Figure 4:
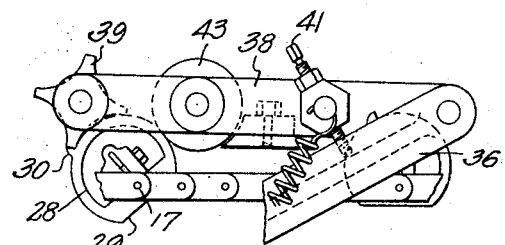
Figure 6:
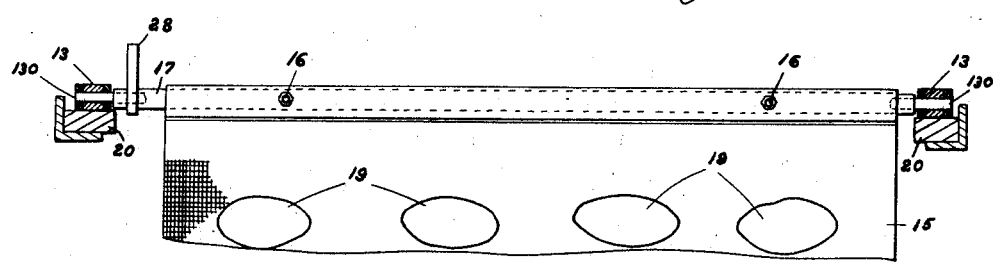
Fig. 6 is a fragmental front elevation, partly in cross section, showing details of the loop conveyor construction.

As will be noted at the lower left hand side of Fig. 2, the pockets 18 generally approach the sprockets 22 in the same condition or positions that they assume when carrying lumps of dough. Occasionally a pocket or loop will be in the position shown in Fig. 7. The occasional abnormally positioned or inverted loop is returned to normal position by the means now to be described. An arm 31 carrying a roller 32 is urged by a spring 33 so that the roller will encounter each of the tilting rings 28 and thus effect a movement of the rods 17 in their journals for properly arranging pockets 18 in a receiving position. The loading mechanism 27 may be of any suitable design and it together with the dough elevating means and the chains 13 of the proofing conveyor are driven in synchronism from motor 34 through a suitable gear box 35. The filled pockets now move upwardly to the uppermost reach in the casing and the lumps are carried back and forth in the casing until they reach the discharge mechanism where the pockets are inverted by the successive movements of each rod 17. As will be noted in Fig. 1 the pockets 18 each containing lumps of dough are inverted but overhanging the foremost rod 17 as they approach the discharge mechanism, and the tilting rings 28 on the rods encounter the mechanism shown in Fig. 3. Said mechanism comprises a pair of arms 36 and 37. The arm 36 has pivoted at its free end a lever 38 which carries at its free end a rotatably mounted star wheel 39. A spring 40 connects an end of arm 37 and an intermediate point on the lever 38. An adjustable set screw 41 is arranged to contact a rib 42 on arm 36 to limit the movement of lever 38 under the influence of spring 40 whereby the star wheel 39 is kept in a suitable elevation in the path of the tilting rings. The star wheel engages the periphery of each tilting ring as it is moved forward during the continuous movement of the conveyor. A safety lug 30, while not essential, may be provided on each tilting ring for contact with the points of the star wheel thereby assuring positive turning of the rods 17 and a consequent movement of the flexible material of the pockets which begins to unroll or open up the overlapping or overhanging portion of the pocket. The star wheel continues this turning movement on the tilting ring until the tilting ring is in such position that further movement of the tilting ring by contact thereof upon the disk or roller 43 causes the flat face 29 to contact roller 43 and the tilting ring is moved to the position shown in Fig. 5, which is about 180 degrees from the position in which such ring is shown in Fig. 3.

There may be provided support bars 200, upon which the loops are supported when moving through the proofer and while the adjoining loops are in overlapping or overhanging relation. The support bars in the lowermost or discharge reach terminate at such place that the tilting rings contact with the star wheel immediately before the loops pass from such support bars. The loop preceding the loop passing from the support bars of the lower or discharge reach or level, is therefore free to assume any natural position that would result from the forces operative thereon.

Figure 5:
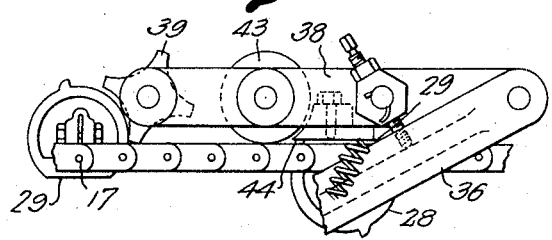

After the tilting ring has been moved to the position shown in Fig. 5, the flat face on the tilting ring contacts a follower piece 44 mounted on arm 38 whereby the tilting ring may be moved ahead bodily while restrained in its position with flat face 29 uppermost. The rods or pipes 17 are so spaced that at about the time one of the rods moves beyond the follower piece, the succeeding rod has been moved to such position that its tilting ring contacts the star wheel. The position of pockets as influenced by the movement of the tilting wheel and rod 17 is best seen in Fig. 1 just above discharge chute 45, the adjacent series of pockets being there shown in various conditions. The dough lumps are discharged into chute 45. From chute 45 the lumps drop to a suitable conveyor 46 by which they are carried away from the proofer. The various parts of the discharge mechanism are so designed and related that adequate time is allowed for each loop to discharge its contents, which invariably will comprise a plural number of lumps of dough. Some lumps of dough may be somewhat slower in leaving the loop or pocket wherefore the lumps discharged from each pocket are retained in the discharge chute by a discharge plate 450 that is periodically moved to permit exhausting of the lumps of dough from the discharge chute to conveyor 46. The simultaneous discharge of the lumps of dough upon the conveyor assures even and proper spacing of the lumps of dough, whereby it may be possible to synchronize the proofer with other devices, for example, a molder which would be the next machine in the chain of operation.

By the provision of the tilting wheels and the means operating thereon just prior to loading and during discharge of the pockets it is possible to proof the lumps of dough automatically allowing the lumps to develop a surface skin or texture which is highly desirable and which is best obtained by the use of the flexible loop type of proofing conveyor, and at the same time avoid any difficulty in controlling the pockets. The positive control of the individual pockets makes possible the efficient synchronized handling of a large variety of sizes and kinds of dough lumps without necessitating any adjustments whatever.

As shown herein the synchronous action of all the parts is derived through the small motor 34 which drives the various gears in gearbox 35. Sprocket 350 with chain 351 drives the proofer drive shaft 352 by way of gear 353. A small gear 354 meshing with large gear 355 serves to turn sprocket 356 for moving the conveyor chain 13. In Fig. 1 it will be seen that sprocket 22 has a gear 357 driving a gear 358 which effects movement of a cam 359. The latter cam operates suitable arms whereby the loading tray 360 fills each of the pockets of the proofing conveyor as they pass beneath. The dough elevator 26 is likewise operated synchronously with the remainder of the device, gear 361 being driven from one of the shafts in gearbox 35 and having driving relation with gear 362. Sprocket 363 which moves with gear 362 moves the chain 364 in the elevator 26.

The discharge plate 450 controlling discharge chute 45 is periodically tripped synchronously with the movement of the pockets by means of a trigger 460 connected by links 461 to the pivotally mounted supporting arms 462 of the plate. The rods supporting the pockets engage the trigger 460 for actuating it. A spring 463 equalizes the action of the trigger and discharge plate.

Discharge belt 46 is also driven at suitable speed and synchronously with the remainder of the device by means of chain 464 operating on sprockets 465 and 466. The former is driven by small gear 467 from gear 355. Bevel gears 468 effect rotation of the drive pulleys for belt 46. While but one practical embodiment of synchronous drive for the entire device is shown herein, it will be understood that other means may be employed for obtaining the properly timed movement and actuation of the parts.

What is claimed is:

1. In combination a pair of endless chains, means to move the chains in unison through a plurality of substantially parallel paths, rods spacing the chains and mounted for free oscillation therebetween, a tilting ring fixed on each rod, a lever yieldably mounted adjacent the path of said tilting rings, a star wheel mounted on the lever for engaging the tilting wheel and effecting rotary movement of the rod and means on said lever for retaining the tilting ring and its associated rod in a predetermined position during a succeeding period of bodily movement of the said rods and tilting ring.

2. In combination a conveyor comprising a pair of chains arranged to travel through a series of horizontal reaches alternately in opposite directions, rods rockingly mounted at opposite ends on said chains for movement therewith, flexible material forming normally depending pockets supported between adjacent rods, the pockets being fixed to the rods at opposite ends, said pockets, when carrying a load through certain alternate reaches bodily overhanging one of the rods thereby retaining the load therein and means on the rod and at a fixed point on one of said certain reaches for effecting rotary movement of each successive rod whereby the overhanging pocket is bodily moved from its overhanging position for discharging the load, said means also including means to positively retain the pocket in said open inverted position for a predetermined interval of travel.

3. In combination a conveyor comprising a pair of endless moving members, oscillatable rods connected between said members at intervals, flexible material fixed to the rods and having pocket forming portions between the rods, an eccentrically mounted cam fixed on each rod, said cams each having a flat face and a projecting lug substantially opposite the flat face, means for engaging the lug on the cam as the pockets move with the endless movable members whereby the rods are turned in their mountings and the attached ends of the pockets are moved thereby and means engaging the flat faces on the cams for holding the rods in a predetermined relation against rotary movement as said rods are carried through a predetermined distance of travel of the endless members.

4. In a proofer the combination of a pair of endless chains constrained to follow a circuitous path through a plurality of vertically spaced horizontal reaches, rods extending between and oscillatable on said chains, flexible pockets fixed at opposite ends to adjacent rods and depending normally under their own weight and the load therein during their travel along alternate reaches, said pockets and the load therein overhanging the foremost of their respective attached rods during travel along the remaining reaches of travel and means comprising a cam ring on each rod and a yieldable non-traveling lever mechanism for imparting partial rotation to each rod at a predetermined point on the lowermost horizontal reach for opening and positively inverting said pockets to discharge the contents of the pockets.

5. In a proofer the combination of a pair of endless chains constrained to follow a circuitous path through a plurality of vertically spaced horizontal reaches, rods extending between and oscillatable on said chains, flexible pockets supported on and fixed at opposite ends to adjacent rods and depending normally under their own weight and the load therein during their travels along alternate reaches, said pockets and the load therein overhanging the foremost of their respective attached rods during travel along the remaining reaches of travel, means comprising an eccentric cam ring on each rod and a yieldable non-traveling lever mechanism for imparting partial rotation to each rod at a predetermined point for opening and positively inverting said pockets to discharge the contents of the pockets, and means to readjust said pockets to a normally depending and fully open position.

6. The combination with a conveyor comprising spaced rods movable about their axes, means to move the conveyor through a suitable path alternately in opposite directions, and flexible loops supported between said rods and fixed thereto, said pockets each adapted to receive a plurality of lumps of dough, of a discharge chute over which the pockets pass during movement of the conveyor, a movable discharge plate controlling said chute, means on the rods whereby the rods may be turned on their axes as the conveyor moves through a horizontal path, means adjacent the discharge chute for engaging the last mentioned means to turn the pockets successively to discharge position over the chute, means controlled by said rods for actuating the discharge plate and a second conveyor synchronized with said first mentioned conveyor and traveling beneath said discharge chute and plate.

7. In a loop conveyor for dough lumps and the like the combination of spaced rods movable on their longitudinal axes, flexible loops each fixed to an adjacent pair of said rods, a member on each rod for turning the rod on its axis, and means comprising a pivoted lever having a roller for engaging and turning said member, and means on said lever for retaining said member in said turned position for a predetermined interval of travel whereby the pocket fixed to an associated rod is inverted and retained for a time in said position.

8. In a loop type conveyor the combination with a series of flexible pocket members, oscillatable rods having adjacent pockets fixed thereto, and eccentric cam wheel on one end of each rod, and means comprising a yieldably mounted lever and a roller thereon for engaging the cam wheel for effecting movement of the rod to adjust the flexible pocket.

In testimony whereof, I have hereunto subscribed my name this 22nd day of January, 1931.

SIGMUND SCHIFF.